(12) United States Patent
Sakai

(10) Patent No.: US 7,748,842 B2
(45) Date of Patent: Jul. 6, 2010

(54) RIM OF SPECTACLE

(76) Inventor: Akira Sakai, 31-1-6, Nishioicho, Sabae-shi, Fukui (JP) 916-0078

( * ) Notice: Subject to any disclaimer, the term of this patent is extended or adjusted under 35 U.S.C. 154(b) by 329 days.

(21) Appl. No.: 11/794,170

(22) PCT Filed: Jan. 11, 2006

(86) PCT No.: PCT/JP2006/000225

§ 371 (c)(1), (2), (4) Date: Jun. 26, 2007

(87) PCT Pub. No.: WO2006/075627

PCT Pub. Date: Jul. 20, 2006

(65) Prior Publication Data

US 2008/0062379 A1 Mar. 13, 2008

(30) Foreign Application Priority Data

Jan. 14, 2005 (JP) ............................. 2005-007103
Jul. 12, 2005 (JP) ............................. 2005-203569

(51) Int. Cl.
*G02C 5/00* (2006.01)
(52) U.S. Cl. ........................................ 351/154; 351/51
(58) Field of Classification Search ................. 351/41, 351/51, 52, 83–86, 154, 103–109
See application file for complete search history.

(56) References Cited

U.S. PATENT DOCUMENTS

| 1,704,232 | A | | 3/1929 | Welsh |
| 2,221,736 | A | * | 11/1940 | Lindblom ................. 351/96 |
| 2,254,746 | A | | 9/1941 | Line |
| 2,384,867 | A | | 9/1945 | Williams |
| 3,243,249 | A | | 3/1966 | Lissac |
| 4,762,406 | A | * | 8/1988 | Steiner ..................... 351/154 |
| 7,210,776 | B2 | * | 5/2007 | Jannard et al. ................ 351/41 |

FOREIGN PATENT DOCUMENTS

| EP | 0 061 002 | * | 9/1982 | ................. 351/154 |
| GB | 1 317 173 | A | 5/1973 | |
| JP | U S55-133418 | | 3/1979 | |
| JP | U S56-170428 | | 5/1980 | |
| JP | U S61-34125 | | 3/1986 | |
| JP | S62-095514 | | 5/1987 | |
| JP | S64-019322 | | 1/1989 | |
| JP | H01-134421 | | 5/1989 | |
| JP | H05-019211 | | 1/1993 | |

(Continued)

*Primary Examiner*—Huy K Mai
(74) *Attorney, Agent, or Firm*—Manabu Kanesaka

(57) ABSTRACT

The present invention provides a rim which can increase a lens holding capacity by a simple structure and can apply a new decoration to a spectacle. In a rim (1) of a spectacle in which a fitting groove (3) is formed in such a manner as to be fitted to a fitting portion (5a) formed so as to protrude to a side surface of a lens (5) and hold the lens (5), a concave groove (4) is formed in a bottom portion of the fitting groove (3) along a top portion (5b) of the fitting portion (5a). A absorbing material may be filled in the concave groove (4) or a paint may be filled in or applied to the concave groove (4).

7 Claims, 3 Drawing Sheets

FOREIGN PATENT DOCUMENTS

| | | |
|---|---|---|
| JP | U H06-53051 | 7/1994 |
| JP | H08-062543 | 3/1996 |
| JP | U 3043375 | 9/1997 |
| JP | 2002-182161 | 6/2002 |
| JP | 2003-329981 | 11/2003 |
| JP | 2004-279887 | 10/2004 |
| JP | 2005-031281 | 2/2005 |

* cited by examiner

RIM OF SPECTACLE

TECHNICAL FIELD

The present invention relates to a rim of a spectacle which can increase a holding capacity of a lens and can increase a decoration performance of the spectacle.

BACKGROUND ART

The rim holding the lens is formed in an annular shape or a semi-annular shape, and a fitting groove having a V-shaped cross section is formed in an inner periphery thereof for holding the lens. Further, the structure is made such that the lens is held to the rim by fitting a fitting portion formed so as to protrude to a side surface of the lens to the fitting groove.

In this case, there is a problem that the lens is expanded and contracted due to a change of temperature after fitting the lens to the rim, the lens is deformed on the basis of an application of a great force to the lens, and a gap is generated between the lens and the rim, whereby the lens rattles or the lens is easily detached from the rim.

In order to solve the problem mentioned above, for example, in a rim of a spectacle described in a patent document 1, the structure is made such that a lens is fitted to a rim so as to expand a groove of the rim at a time of installing the lens, by using an elastic material for a material of the rim, and forming the groove of the rim in a V-shaped groove with larger depth than a conventional rim, whereby the rim can absorb an expansion or a contraction of the lens due to the temperature change. Further, in a spectacle described in a patent document 2, a holding structure of a lens fitted to a rim is improved by winding the lens around a periphery of the rim holding the lens in an inner periphery thereof, and sandwiching a sheet-like cushion member between the rim and the lens.

Further, in recent years, the spectacle is positioned as a part of a fashion, and spectacles having various decorations are going to be put on the market. A consumer tends to express a personality by wearing a different spectacle from the other one. In this state of society mentioned above, a wide variety of design characteristic is required for the spectacle.

In the spectacle described in the patent document 2 mentioned above, a quality feeling and a warmth are applied to the rim by a sheet-like cushion interposed between the rim and the lens. Further, in a rim shape of a spectacle frame described in a patent document 3, an outer appearance of a rim line is made thick and a new fashion characteristic is applied by forming a cross sectional shape of the rim approximately in a trapezoidal shape, and sloping a front surface of the rim to an inner side while forming a concave groove to which the lens is fitted in an inner periphery thereof.

Patent Document 1: Japanese Unexamined Patent Publication No. 05-19211
Patent Document 2: Japanese Unexamined Patent Publication No. 2003-329981
Patent Document 3: Japanese Utility Model No. 3043375

DISCLOSURE OF THE INVENTION

Problem to be Solved by the Invention

These techniques are remarkable in the respect of an increase of a decoration performance of the spectacle and an improvement of the lens holding capacity.

However, with regard to securely holding the lens, the techniques described in the patent document 1 and the patent document 2 are complex and have a problem that a cost is increased. Further, on the basis of a request of variety of the decoration, there is required a different decoration from the decorations described in the patent document 2 and the patent document 3.

The present invention is made by taking the problem mentioned above into consideration, and a first object of the present invention is to provide a rim which can increase a lens holding capacity by a simple structure. Further, a second object of the present invention is to provide a rim which can apply a new decoration to a spectacle while achieving the first object.

Means for Solving the Problem

In order to achieve the first object mentioned above, in accordance with a first aspect of the present invention, there is provided a rim of a spectacle in which a fitting groove is formed in such a manner as to be fitted to a fitting portion formed so as to protrude to a side surface of a lens and hold the lens, wherein a concave groove is formed in a bottom portion of the fitting groove along a top portion of the fitting portion.

In accordance with this structure, the top portion of the fitting portion formed so as to protrude to the side surface of the lens can engage with the concave groove. Accordingly, both of the fitting groove and the concave groove hold the lens, and even if the lens is somewhat expanded or contracted due to a temperature change or the like, a problem that a rattling is generated in the lens or the lens is detached is hard to be generated.

Further, a rigidity of the rim is increased so as to be hard to be deformed, by forming the concave groove, and it is possible to effectively prevent the lens from falling away due to the deformation of the rim.

In this case, in accordance with a second aspect of the present invention, a absorbing material such as a rubber or the like may be filled in an inner portion of the concave groove.

Further, the rim of the spectacle in accordance with the present invention may be made of a resin, or may be made of a metal such as a titanium or the like in accordance with a third aspect of the present invention.

In order to achieve the second object of the present invention, in accordance with a fourth aspect of the present invention, the structure is made such that the rim is formed by a translucent or semi-translucent resin material, and a coloring material is filled in an inner portion of the concave groove. Further, in accordance with a fifth aspect of the present invention, the structure is made such that the rim is formed by a translucent or semi-translucent resin material, and a coloring material is applied to at least a part of an inner wall surface of the concave groove.

In accordance with this structure, the coloring material applied to or filled in the inner portion of the concave groove comes to the surface as a pattern on a surface of the rim, whereby it is possible to apply a new decoration performance to the spectacle.

In this case, in the rim of the spectacle in accordance with the present invention, it is sufficient that a width of the concave groove is set to a dimension capable of being engaged with the top portion of the fitting portion of the lens, however, it is preferable that the width of the concave groove is within a range equal to or more than ⅕ and equal to or less than ½ of the width of the rim in accordance with a sixth aspect of the present invention, and it is preferable to set the width about 1/3 in the metal rim.

EFFECT OF THE INVENTION

In accordance with the present invention, it is possible to increase the holding capacity of the lens only by forming the concave groove with which the top portion can be engaged in the bottom portion of the fitting groove of the rim, along the top portion of the fitting portion formed so as to protrude to the side surface of the lens, and it is advantageous in cost. Further, it is possible to effectively suppress a so-called "squeal" caused by a friction between the lens and the rim at a time when the lens rattles.

Further, it is possible to increase a rigidity of the rim so as to make the rim hard to be deflected, and it is possible to prevent the lens from falling away due to the deformation of the rim.

Further, it is possible to make a linear pattern come to the surface on the surface of the rim, by forming the rim by the translucent or semi-translucent resin material, and filling or applying the coloring material or the like such as a paint or the like in or to the concave groove, whereby it is possible to provide a spectacle having a novel design.

BRIEF DESCRIPTION OF THE DRAWINGS

FIGS. 5(a) and 5(b) are enlarged outline views of a rim in FIG. 4, in which FIG. 5(a) is a front elevational view of the rim, and FIG. 5(b) is a plan view of the rim.

Figure 1:
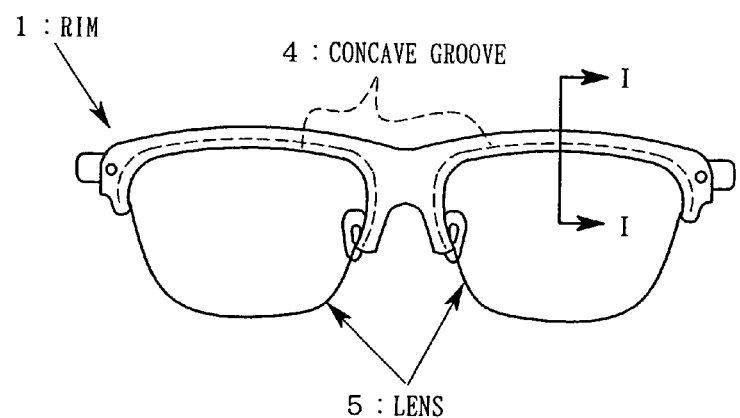
FIG. 1 is a view of a rim in accordance with a first embodiment of the present invention as seen from a front surface.

DESCRIPTION OF REFERENCE NUMERALS 1 rim
1a pattern
3 fitting groove
4 concave groove
5 lens
5a fitting surface (fitting portion)
5b top portion
absorbing material
paint (coloring material)

BEST MODE FOR CARRYING OUT THE INVENTION

A description will be in detail given below of preferable embodiments in accordance with the present invention with reference to the accompanying drawings.

Figure 2:
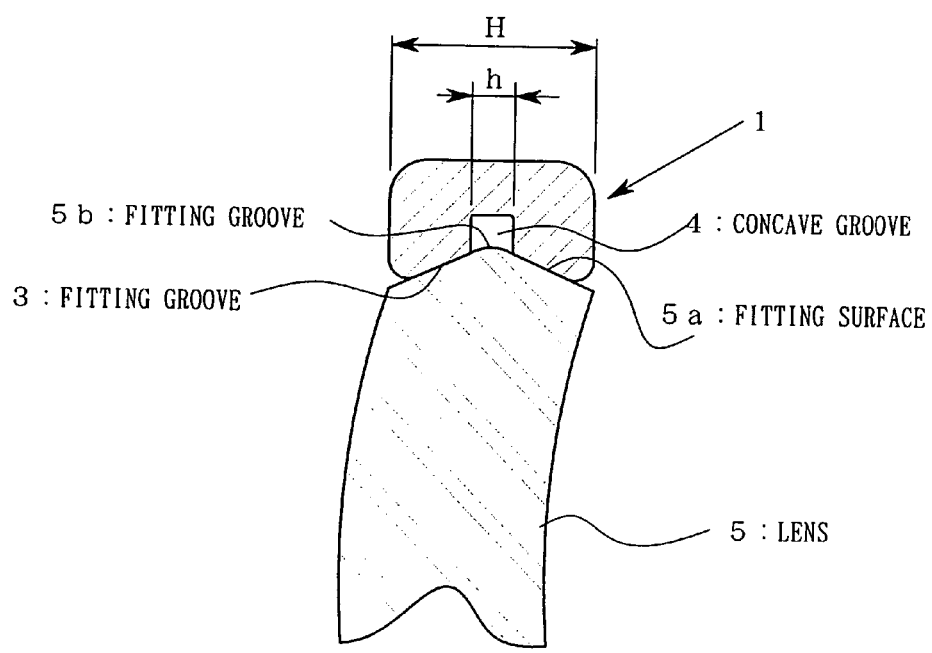
FIG. 2 is an enlarged cross sectional view of the rim in accordance with the first embodiment of the present invention in a direction I-I in FIG. 1.

FIGS. 1 and 2 show a first embodiment of a rim in accordance with the present invention, in which FIG. 1 is a view of a rim as seen from a front surface, and FIG. 2 is an enlarged cross sectional view in a direction I-I in FIG. 1.

A rim 1 corresponding to a semi-annular shaped half rim may be formed by a metal such as a titanium or the like, or may be formed by a translucent or semi-translucent resin material. An inverted V-shaped fitting groove 3 fitted to a convex fitting surface 5a formed in a side surface of a lens 5 is formed in an inner peripheral surface of the rim 1. Further, a concave groove 4 is formed in a bottom portion of the fitting groove 3.

The concave groove 4 is continuously formed approximately over a whole length of the fitting groove 3 along a top portion 5b of the fitting surface 5a of the lens 5. It is preferable that the concave groove 4 and the top portion 5b can be engaged with each other. Accordingly, it is preferable that a width h of the concave groove 4 is within a range equal to or more than 1/5 and equal to or less than 1/2 with respect to a width H of the rim 1, and it is preferable that the width h is set to about 1/3 in the case of the metal rim.

Further, the lens 5 is fitted to the fitting groove 3 in such a manner that the top portion 5b is engaged with the concave groove 4. In accordance with this structure, it is possible to hold the lens 5 by both of the fitting groove 3 and the concave groove 4, it is possible to minimize a rattling of the lens 4 in the rim 1 even if the lens 5 is somewhat expanded or contracted due to a temperature change, and a problem that the lens is detached is hard to be generated. Further, it is possible to effectively suppress a so-called "squeal" caused by a friction between the lens 5 and the rim 1 at a time when the rattling is generated.

Further, a rigidity of the rim 1 is increased by forming the concave groove 4, and the rim 1 is hard to be deformed, whereby it is possible to prevent the lens 5 from falling away.

Figure 3:
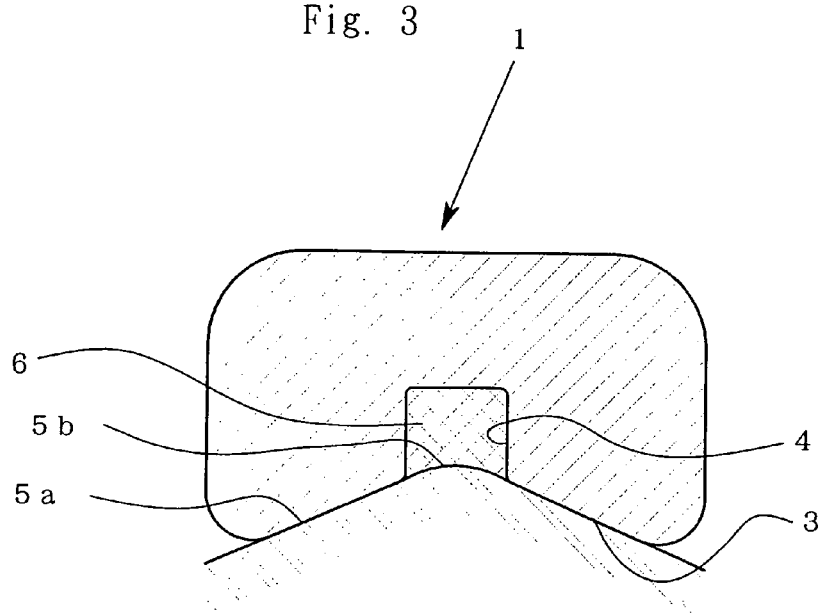
FIG. 3 is an enlarged cross sectional view of a concave groove 4 in accordance with a second embodiment of the present invention.

FIG. 3 is an enlarged cross sectional view of the concave groove 4 in accordance with a second embodiment of the present invention.

In this embodiment, an absorbing material 6 is filled in an inner portion of the concave groove 4 of the rim 1 which is the same as the rim in accordance with the first embodiment formed by the translucent or semi-translucent resin material. As the absorbing material 6, it is possible to employ a rubber such as a natural rubber, a synthetic rubber or the like, and a resin material such as an urethane or the like.

In this case, the absorbing material 6 may be colored in the same color as the rim 1 or a different color therefrom, or may be transparent and colorless. It is possible to make the absorbing material 6 come to the surface as a linear pattern on the surface of the rim 1 by using the absorbing material 6 colored in the different color from the rim 1.

Figure 4:
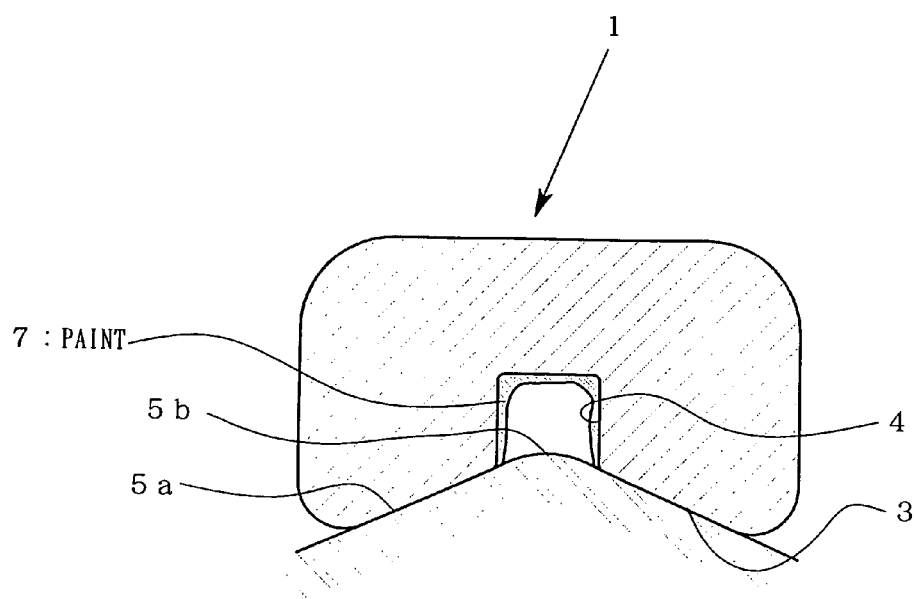
FIG. 4 is an enlarged cross sectional view of a concave groove 4 in accordance with a third embodiment of the present invention.

FIG. 4 is an enlarged cross sectional view of the concave groove 4 in accordance with a third embodiment of the present invention.

In this embodiment, a paint 7 is applied to an inner wall surface of the concave groove 4 of the same rim 1 as the rim in accordance with the first embodiment formed by the translucent or semi-translucent resin material. In this case, in the embodiment in FIG. 4, the paint 7 is applied to both of a bottom surface and both side surfaces of the inner wall surface of the concave groove 4, however, the paint 7 may be applied to any one of the bottom surface and the side surfaces.

Figure 5A:
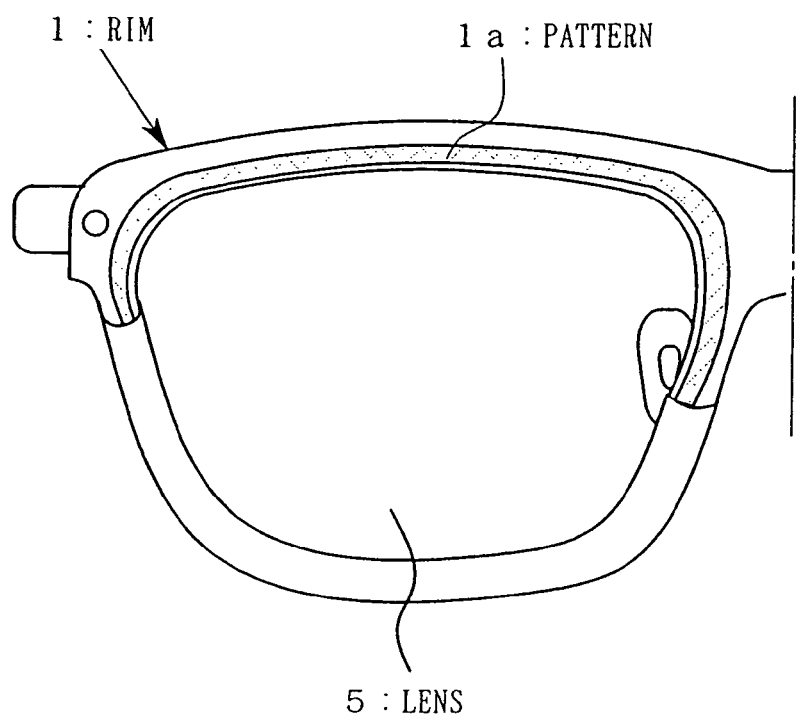
Figure 5B:
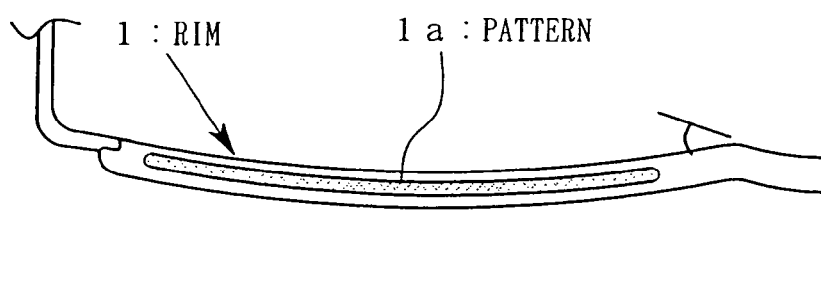

FIGS. 5(a) and 5(b) are enlarged outline views (only one surface is illustrated) of the rim in FIG. 4, in which FIG. 5(a) is a front elevational view of the rim, and FIG. 5(b) is a plan view of the rim. In this case, as shown in FIGS. 5(a) and 5(b), the rim 1 in accordance with this embodiment is constituted by an annular full rim. Further, an upper half of the rim 1 is formed by a transparent or semi-transparent resin material, however, a lower half of the rim 1 is formed by a colored opaque resin material.

Since the upper half of the rim 1 is formed transparent or semi-transparent, the paint 7 applied to the concave groove 4 comes to the surface on an upper surface of the rim 1, and forms a pattern 1a. The pattern 1a appears on a front surface portion, a back surface portion (not shown) and an upper surface portion of the rim 1.

Accordingly, it is possible to apply a novel decoration to the spectacle.

The description is given of the preferable embodiments in accordance with the present invention, however, the present invention is not limited to the embodiments mentioned above.

For example, reinforcing ribs may be formed at a predetermined interval in the inner portion of the concave groove 4. Further, the paint 7 may be intermittently applied to the inner portion of the concave groove 4 in place of being continuously applied. Further, the paint 7 may be filled in the inner portion of the concave groove 4 in place of being applied to the inner portion of the concave groove 4.

Further, a cross sectional shape of the concave groove 4 is not limited to an illustrated quadrangular shape, but may be formed in various shapes such as a circular arc shape, a triangular shape, an infinite shape and the like. Further, in the case that the rim in accordance with the present invention is formed by the metal such as a titanium or the like, it is possible to form the groove in accordance with a known roller work or a special form extrusion molding.

INDUSTRIAL APPLICABILITY

The present invention can be applied to various spectacles having the rims, and can be applied to a spectacle made of a metal and the other spectacles made of the other materials without being limited to the spectacle made of the resin.

The invention claimed is:

1. A combination comprising a lens and a rim of a spectacle,
    wherein said lens includes a V-shape edge portion having a top portion and fitting surfaces on two sides of the top portion, and
    said rim includes a V-shape fitting groove corresponding to the V-shape edge portion to receive the fitting surfaces of the lens to hold the lens, and a concave groove formed only at a bottom portion of the fitting groove extending along the top portion of the lens, said concave groove forming an empty space so that the top portion of the lens is located only partially in the concave groove and the fitting surfaces of the lens directly contact the fitting groove.

2. A combination according to claim 1, wherein said rim is made of a metal material.

3. A combination according to claim 1, wherein said rim is formed by a translucent or semi-translucent resin material, and a coloring material is applied onto an inner portion of said concave groove.

4. A combination according to claim 1, wherein a width of said concave groove is equal to or more than ⅕ and equal to or less than ½ of the width of said rim.

5. A combination according to claim 1, wherein said rim is formed by a translucent or semi-translucent resin material, and a coloring material is applied to only a part of an inner wall surface of said concave groove.

6. A combination comprising a lens and a rim of a spectacle,
    wherein said lens includes a V-shape edge portion having a top portion and fitting surfaces on two sides of the top portion, and
    said rim includes a V-shape fitting groove corresponding to the V-shape edge portion to receive the fitting surfaces of the lens to hold the lens, a concave groove formed only at a bottom portion of the fitting groove extending along the top portion of the lens, and an absorbing material filled only in the concave groove so that the top portion of the lens is located in the concave groove and abuts directly against the absorbing material, and the fitting surfaces of the lens directly contact the fitting groove.

7. A combination according to claim 6, wherein said rim is formed by a translucent or semi-translucent resin material.

* * * * *